United States Patent
Akamatsu et al.

(10) Patent No.: US 7,036,368 B2
(45) Date of Patent: *May 2, 2006

(54) HEATING RESISTOR TYPE AIR FLOW RATE MEASURING APPARATUS

(75) Inventors: Masuo Akamatsu, Ibaraki (JP); Shinya Igarashi, Ibaraki (JP); Izumi Watanabe, Ibaraki (JP); Kaoru Uchiyama, Ibaraki (JP); Tadashi Isono, Ibaraki (JP)

(73) Assignees: Hitachi, Ltd., Tokyo (JP); Hitachi Car Engineering Co., Ltd., Hitachi (JP)

( * ) Notice: Subject to any disclaimer, the term of this patent is extended or adjusted under 35 U.S.C. 154(b) by 30 days.

This patent is subject to a terminal disclaimer.

(21) Appl. No.: 10/634,782

(22) Filed: Aug. 6, 2003

(65) Prior Publication Data

US 2004/0025584 A1 Feb. 12, 2004

Related U.S. Application Data

(63) Continuation of application No. 10/036,509, filed on Jan. 7, 2002, now abandoned, which is a continuation of application No. 08/784,077, filed on Jan. 17, 1997, now Pat. No. 6,435,023.

(30) Foreign Application Priority Data

Jan. 17, 1996 (JP) ................................................ 8-5544
Feb. 29, 1996 (JP) .............................................. 8-42428

(51) Int. Cl.
*G01F 1/68* (2006.01)

(52) U.S. Cl. ................................................. 73/204.25

(58) Field of Classification Search ............. 73/204.23, 73/204.25, 204.16, 204.26, 204.27, 204.17
See application file for complete search history.

(56) References Cited

U.S. PATENT DOCUMENTS

| | | | | |
|---|---|---|---|---|
| 4,624,138 A | * | 11/1986 | Ono et al. | 73/204.26 |
| 4,649,745 A | * | 3/1987 | Kondo et al. | 73/204.14 |
| 4,683,858 A | | 8/1987 | Sato et al. | 123/486 |
| 5,193,388 A | * | 3/1993 | Kleinhans | 73/204.14 |
| 5,569,851 A | * | 10/1996 | Ichimaru et al. | 73/204.15 |
| 5,635,635 A | * | 6/1997 | Tsukada et al. | 73/204.18 |
| 5,817,932 A | * | 10/1998 | Nishimura et al. | 73/118.2 |
| 6,032,526 A | * | 3/2000 | Akamatsu | 73/204.17 |
| 6,357,293 B1 | | 3/2002 | Ando et al. | 73/204.17 |
| 6,494,090 B1 | | 12/2002 | Losing et al. | 73/204.26 |
| 6,681,742 B1 | * | 1/2004 | Hirayama et al. | 123/399 |

FOREIGN PATENT DOCUMENTS

| | | |
|---|---|---|
| JP | 62-812 | 1/1987 |
| JP | 1-206223 | 8/1989 |

* cited by examiner

*Primary Examiner*—Max Noori
(74) *Attorney, Agent, or Firm*—Crowell & Moring LLP

(57) ABSTRACT

A heating resistor type air flow rate measuring apparatus is provided with a couple of heating resistors placed at the positions where those resistors may each interfere thermally with respect to an air flow, and a couple of driving circuits for driving those heating resistors. The air flow rate signal is obtained by calculating the difference between the output signals of a couple of heating resistors in terms of heat radiation rate effected by an air flow, and adding the difference value onto the output signal of one of heating resistors.

16 Claims, 14 Drawing Sheets

HEATING RESISTOR TYPE AIR FLOW RATE MEASURING APPARATUS

This application is a continuation of application Ser. No. 10/036,509, filed Jan. 7, 2002 now abandoned, which is a continuation of application Ser. No. 08/784,077, filed Jan. 17, 1997, now U.S. Pat. No. 6,435,023, issued Aug. 20, 2002.

BACKGROUND OF THE INVENTION

The present invention relates to an air flow meter for measuring the intake air flow rate to an internal combustion engine, especially, a heating resistor type air flow rate measuring apparatus for measuring the air flow rate in the condition accompanied with a backward flow in a pulsating flow.

The air flow in an internal combustion engine is pulsated by a continuous make and break operation of the intake air valve. The pulsation is so amplified by the effect of the columnar vibration in the intake air duct, and the air flow inside the intake air pipe becomes a backward flow in specific conditions related to the number of rotations of the engine and the aperture of the throttle valve. This backward flow brings about various bad effects in the heating resistor type air flow rate measuring apparatus. As for an apparatus for solving this problem, a prior art apparatus disclosed in Japanese Patent Application Laid-Open No. 1-206223 (1989) is known as an air passage structure having a sub air duct shaped in a letter I (or L) which is used as a means for increasing the accuracy of the measurement of the heating resistor type air flow rate measuring apparatus operated under a condition where a backward flow occurs with a pulsating flow. In this prior art device, the air passage is so configured that the backward flow directly blows against the heating resistor by forming a wall facing against the backward flow.

As for another apparatus for reducing the bad effect of the backward flow, a prior art device is disclosed in Japanese Patent Application Laid-Open No. 62-812 (1987). In this prior art device, similarly to the present invention, by detecting the direction of the air flow using the thermal interference between a couple of heating resistors, the output voltage signals from the heating resistors are altered by judging the direction of the air flow; when the air flow is a forward flow, the output voltage to be used is selected from the output voltage signal of the heating resistor for the forward flow; when the air flow is a backward flow, the output voltage signal from the heating resistor for the backward flow is selected.

In general, it is difficult to measure the direction of the air flow, forward or backward, selectively only by using a single heating resistor. In order to solve this problem, for example, as shown in FIG. 10, in observing the average output of the heating resistor type air flow rate measuring apparatus by varying the boost pressure by making the throttle valve gradually open while the number of rotations of the engine is maintained to be constant, the average output of the air flow rate increases linearly as the intake negative pressure increases under a certain threshold value, and for the boost pressure above a certain threshold value, the average output of the air flow rate is estimated to be larger than the actual air flow rate (which is designated as an over-shooting phenomena). Though the pulsation in the air flow rate in the heating resistor type air flow rate measuring apparatus is relatively small when the throttle valve opens with a small aperture, the amplitude of the pulsation in the air flow rate increases as the throttle valve gets to open, and finally, at a throttle valve angle larger than a certain angle (about 30 to 50°) (in the right region of A in FIG. 10), the pulsation amplitude contains the backward flow component. Thus, when the backward flow occurs, as the heating resistor can not discriminate the direction of the air flow whether forward or backward as described above, the average output of the air flow rate is estimated with the forward flow component as well as the backward flow component, and thus takes on larger values.

By means of forming a wall against the direction of the backward flow as described above for the prior art, and making he air passage structure so that the backward flow may not low directly against the heating resistor, it is possible to reduce the estimation error for the average output. However, the reduced error with this means is only half of the overall error. This is because the amount of forward flow increases as the amount of backward flow increases. Thus, in order to reduce the estimation error due to the backward flow, it is necessary to reduce the output value of the forward flow when the backward flow occurs or subtract the backward flow component from the forward flow component as well as the measurement of the forward flow component. There is a prior art apparatus related to this solution in which, in case the backward flow is observed by detecting the direction of the air flow by comparing the output signals from those two heating resistors using a couple of heating resistors as disclosed in the other prior art described above, the backward flow component is subtracted from the forward flow component. This method has yet another problem. One is related to the reduction of resolution in supplying data to the micro computer. DC voltage handled by many micro computers used for general automotive applications is between 0 and 5.12 (V). However, in this method where both the forward flow and the backward flow have a similar relationship between the air flow rate and the output voltage, the resolution of the forward flow is reduced. In an extreme case, the threshold voltage 2.56(V) is used and the range below 2.56(V) is for the range of the output voltage for the backward flow and the range over 2.56(V) is for the range of the output voltage for the forward flow. Thus, the resolution of the output voltage for the forward flow in this case is half of the resolution when the entire range between 0 and 2.56(V) can be used for the forward flow. Though the threshold voltage 2.56(V) in this case is a somewhat extreme case, the resolution for the forward flow is reduced because the threshold voltage should be determined between 1(V) and 2(V) in order to measure the backward flow precisely.

If the heating resistor has a thermal response delay, the detection of the backward flow is delayed when comparing the output signals from the heating resistors. This detection delay has an effect on the measurement precision. This can be illustrated with FIGS. 11A and 11B; when the backward flow begins to rise up at point B in FIG. 11A, the output signal level of the backward flow does not exceed the output signal level of the forward flow, and therefore, the existence of the backward flow is not proved until the output signal level of the backward flow reaches point C; thus, the detection of the backward flow is so delayed.

Further, as disclosed in Japanese Patent Application Laid-Open No. 62-812 (1987), the conventional apparatus determines a direction of air flow by using two heating resistors and produces an output signal by using either one of the detection signals. A noise component produced due to the mutual interference between the two heating resistors and included in the output signal is moderated by attenuating the alternating current component.

However, because the output signal is attenuated in the prior art apparatus, there is the problem that the delay of detection becomes large at the time when the air flow is inverted and thus the precision of the measurement deteriorates.

SUMMARY OF THE INVENTION

Therefore, a first object of the present invention is to increase the precision of the measurement of the air flow rate in the pulsated flow accompanying with the backward flow in a practical on-board environment, which is one of the major problems in the above described heating resistor type air flow rate measuring apparatus, and to provide a heating resistor type air flow rate measuring apparatus which has advantages in ease of handling, reliability and cost.

A second object of the present invention is to provide an improved heating resistor type air flow rate measuring apparatus which can reduce the above-mentioned noise, thus maintaining the precision of measurement.

In order to solve the above-described first problem, a couple of heating resistors are placed at positions which interfere with the air flow with respect to thermal properties, and if the air flow is a forward flow, the output signal from the sensor is corrected by the electronic circuit so that the output signal for the forward flow may be equal to the output signal for the backward flow, but if the air flow is a backward flow, the difference between the output signal for the forward flow and the output signal for the backward flow is so adjusted as to be larger. In addition, the larger one of the output signals from those two heating resistors is so adjusted as to be equalized to be the lower one, and if the air flow is a backward flow, by reducing the output signal of the heating resistor for the forward flow, the overall average value of the output signals is thus so adjusted as to be lowered. In this method, the difference between the output signal for the forward flow and the output signal for the backward flow which occurs only when the air flow is a backward flow is used as the correction value. With this method, the switching operation of the output signals for the forward flow and the backward flow by using the switching circuit can be eliminated. And furthermore, the threshold value for separating the forward flow and the backward flow is not required and the output voltage used for the heating resistor type air flow rate measuring apparatus can be varied between 0 and 5.12(V), and therefore, a higher resolution for the output signal can be established when the air flow is a forward flow. As the difference between the output signal from the heating resistor for the forward flow and the output signal from the heating resistor for the backward flow necessarily arises when the air flow is a backward flow even if the heating resistors have a thermal response delay, the detection and judgment of the backward flow can be performed precisely.

Further, the preferable apparatus for attaining the above-described second object is as follows.

A heating resistor type air flow rate measuring apparatus is provided in which a forward flow detection signal is detected from a heating current necessary to heat to the predetermined temperature a forward flow heating resistor installed in an air passage, and a backward flow detection signal is detected from a heating current necessary to heat a backward flow heating resistor installed in the air passage to the predetermined temperature. The apparatus comprises:

a cancelling means for cancelling a differential mode noise included in each of the detection signals by adding the component of the alternating current of the backward flow detection signal to the forward flow detection signal and adding the component of the alternating current of the forward flow detection signal to the backward flow detection signal.

Another preferable apparatus related to the second object is as follows.

A heating resistor type air flow rate measuring apparatus is provided with a pair of air flow rate detecting parts for detecting heating currents necessary to heat a forward and a backward flow heating resistor installed in an air passage to the predetermined temperature, respectively, as a forward flow detection signal and a backward flow detection signal, in order to output an air flow rate signal including a directional component of the air flow in the air passage by using each detection signal. The apparatus comprises:

a cancelling means for cancelling differential mode noises included in the forward and the backward detection signals by adding the component of the alternating current of the backward flow detection signal to the forward flow detection signal and adding the component of the alternating current of the forward flow detection signal to the backward flow detection signal, and outputting the forward and the backward flow cancellation signals;

wherein an air flow rate signal is output by using the forward and the backward flow cancellation signals instead of the forward and the backward flow detection signals.

A still further preferable apparatus related to the second object is as follows.

A heating resistor type air flow rate measuring apparatus comprising:

a pair of air flow rate detecting parts for detecting heating currents necessary to heat a forward and a backward flow heating resistor installed in an air passage to the predetermined temperature, respectively, as a forward flow detection signal and a backward flow detection signal, a signal comparing means for determining the direction of the air flow in the air passage by the comparison of large and small of the forward and the backward flow detection signals, a signal selecting means for selecting one of the forward and the backward flow detection signals on the basis of the result of determination, and a differential amplifying circuit for switching and inputting the forward and the backward flow detection signals, adding an alternating current component of the backward flow detection signal to the input forward flow detection signal, and switching and outputting either one of an output signal higher than a reference voltage in proportion to the added signal and an output signal lower than the reference voltage in proportion to the input backward flow detection signal;

wherein an air flow rate signal including a directional component of the air flow is output by using the output signal from the differential amplifying circuit.

A still further preferable apparatus related to the second object is as follows.

A heating resistor type air flow rate measuring apparatus comprising:

a pair of air flow rate detecting parts for detecting beating currents necessary to heat a forward and a backward flow heating resistor installed in an air passage to the predetermined temperature, respectively, as a forward flow detection signal and a backward flow detection signal, a signal comparing means for determining the direction of the air flow in the air passage by the comparison of large and small of the forward and the backward flow detection signals, a signal selecting means for selecting one of the forward and the backward flow detection signals on the basis of the result of determination, and a differential amplifying circuit for switching and inputting the forward and the backward flow detection signals, inverting the phase of an alternating current component of the forward flow detection signal and adding the resultant signal to the input backward flow detection signal, and switching and outputting either one of an output signal higher than a reference voltage in proportion to the forward flow detection signal and an output signal lower than the reference voltage in proportion to the added signal;

wherein an air flow rate signal including a directional component of the air flow is output by using the output signal from the differential amplifying circuit.

DETAILED DESCRIPTION OF THE PREFERRED EMBODIMENTS

Preferred embodiments of the present invention will be explained hereinafter. Firstly, the preferred embodiments related to the apparatus which can attain the first object will be described with reference to FIGS. 1 to 12.

Figure 1:
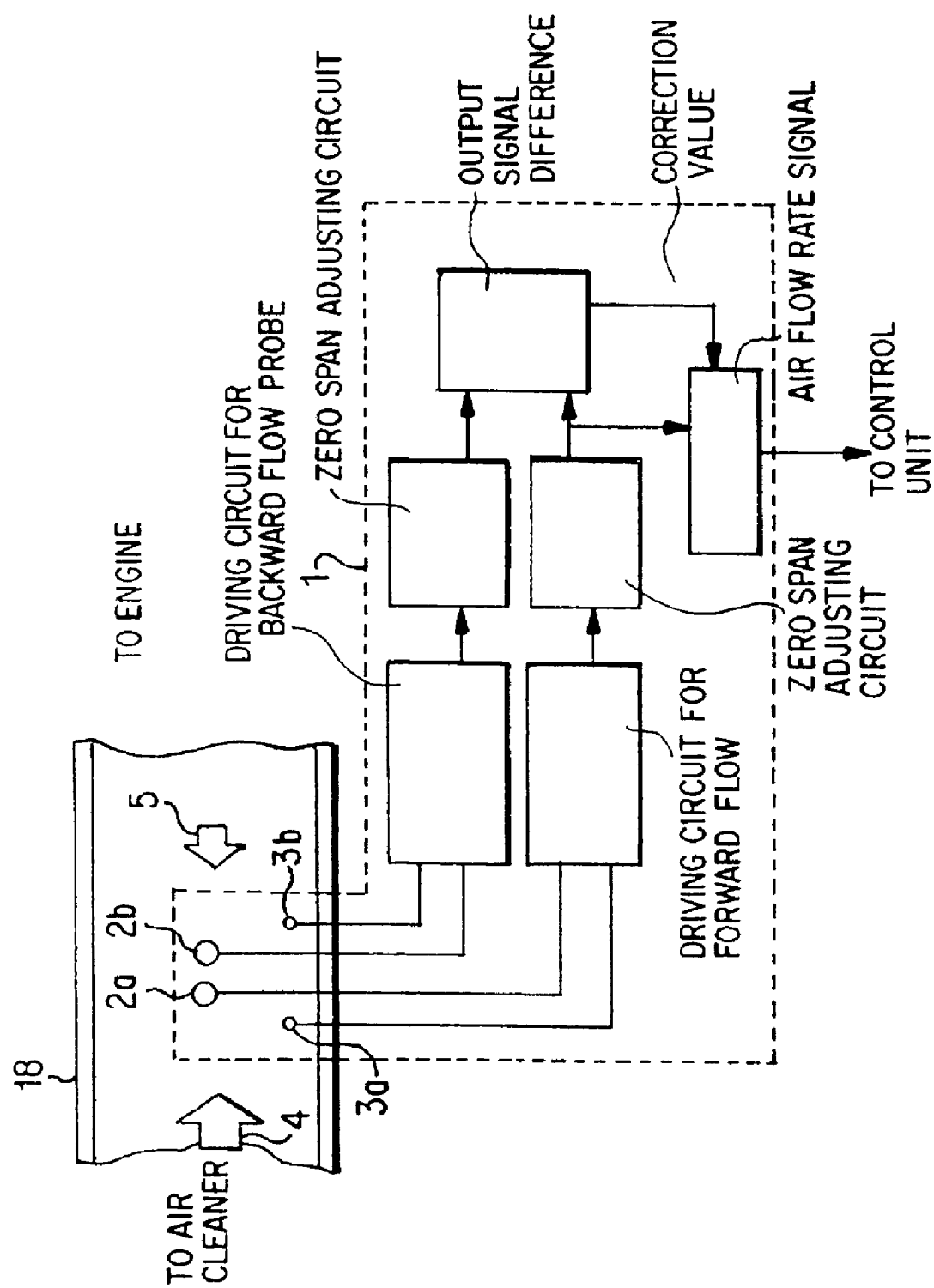
FIG. 1 is a block diagram of the heating resistor type air flow rate measuring apparatus according to one embodiment related to a first object of the present invention.

FIG. 1 is a block diagram showing the structure of the heating resistor type air flow rate meter as one embodiment of the present invention. A couple of heating resistors for air flow rate measurement are installed in the intake air duct 18 of the engine. In FIG. 1, the left side of the intake air duct leads to the air cleaner, and the right side leads to the engine. Therefore, the air flow running in the intake air duct from the air cleaner to the engine is defined as the forward flow air flow 4, and the air flow running in the opposite direction is defined as the backward flow air flow 5.

A couple of heating resistors are placed in the intake air duct, each of which is driven by an independent drive circuit, respectively. Although a single drive circuit can drive both of the heating resistors theoretically, there happens to be a thermal response delay with this configuration in which the frequency response for about 20 to 200 Hz can not be established in a practical engine operation environment, and hence, the direction of the air flow can not be discriminated. This drive circuit is controlled in feedback mode by supplying the heating flow to the heating resistors so that the temperature difference between the heating resistors and heat-sensitive resistors (the heating and heat-sensitive resistors generally shown as 2a, 2b, 3a, 3b) installed separately for measuring the intake air temperature may be maintained at a constant value. Those two heating resistors are placed in positions where the heated air flows interfere thermally with the heating resistors at the upper stream or the down stream of the air flow, respectively. When the forward flow air flow 4 occurs, the heat generated by the forward flow heating resistor tries to heat up the backward flow heating resistor located in the down stream, and when the backward flow air flow occurs, the heat generated by the backward flow heating resistor tries to heat up the forward flow heating resistor located in the upper stream. With this configuration, for example, when the forward flow occurs, the heating flow for keeping the constant temperature difference between the backward flow heating resistor and its corresponding heat-sensitive resistor can be less than the heating flow for the forward flow heating resistor because the backward flow heating resistor gets the heat generated by the forward flow heating resistor. Thus, the comparison between the heating flows of those two heating resistors can teach the direction of the air flow, forward flow or backward flow, and the air flow rate.

Figure 2:
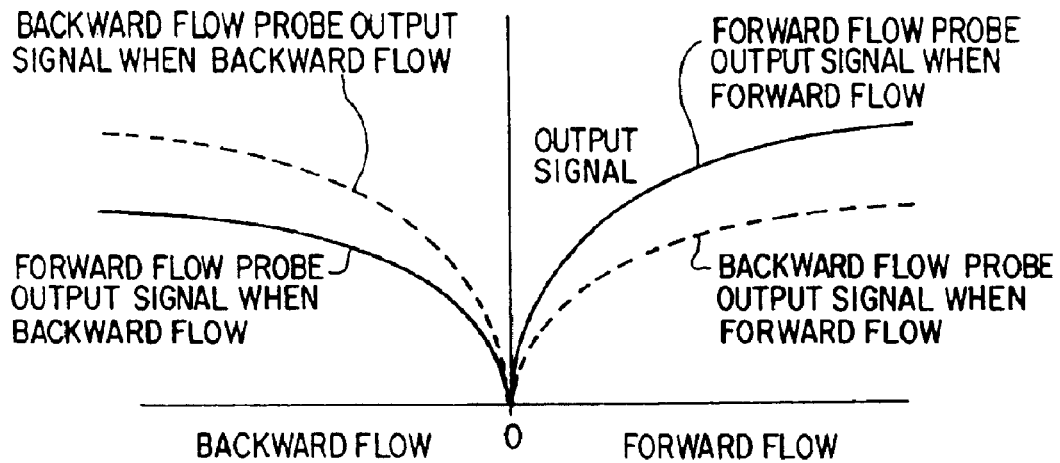
FIG. 2 shows output signal curves of the individual heating resistors in case of altering the air flow directions when using the thermal interference between two heating resistors.

FIG. 2 shows the characteristic of the air flow measurement, where the air flow rate is plotted with respect to the output signal from the heat resistors extended in the horizontal axis. Each curve corresponds to the cases for forward flow and backward flow, respectively. As the output signal of the individual heating resistors fundamentally corresponds to the heating flow supplied to the individual heating resistors, when the forward flow occurs, the output signal of the forward flow heating resistor is larger, and the output signal of the backward flow heating resistor is smaller. Though the heating flow is so defined as shown above, the relationship in terms of the output signal voltage can be arbitrarily adjusted by the output control and by the zero span circuit coupled with the drive circuit.

Figure 3:
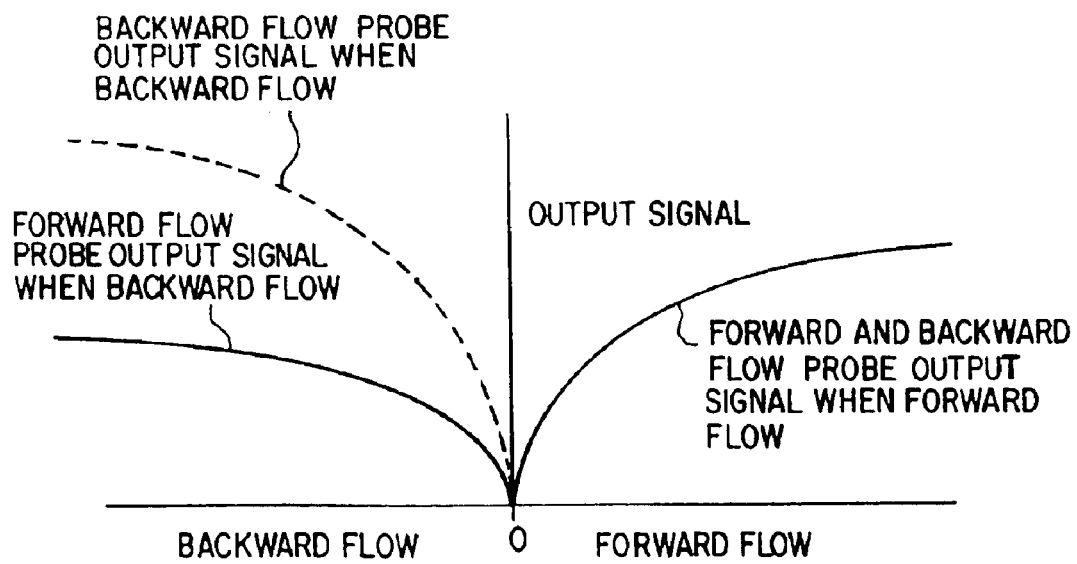
FIG. 3 shows output signal curves of the individual heating resistors in case of altering the air flow directions showing one embodiment related to the first object of the present invention.

FIG. 3 shows an example of the output signal characteristic of two heating resistors used in the heating resistor type air flow rate measuring apparatus of the present invention. In the present invention, when the forward flow occurs, the output signal characteristic of the heating resistor for the forward flow and the output signal characteristic of the heating resistor for the backward flow are adjusted so as to be approximately equivalent to each other. Thus, the output signals from two heating resistors when the forward flow occurs are identical to each other, but the difference between the output signals shown in FIG. 3 when the backward flow occurs is greater than the difference between the output signal shown in FIG. 2. This can be explained as follows: though the heating flow used in the case shown in FIG. 3 is the same as the heating flow in FIG. 2, the backward flow heating resistor gets the heat generated by the forward flow heating when the forward flow occurs, and the output signal of the backward flow heating resistor is amplified by the zero span circuit so as to make larger the sensitivity of the backward flow heating resistor to the air flow rate when there is a generic output signal of the backward flow heating resistor. According to this output signal characteristic, the output signal can be corrected by the following formula 1 when the backward flow occurs.

$$Vout=Vf-kx(Vr-Vf)+Voffset \ldots \quad (1)$$

where, Vout: the output signal of the heating resistor type air flow rate measuring apparatus after the backward flow correction, Vf: the output signal of the forward flow heating resistor, Vr: the output signal of the backward flow heating resistor, k: an arbitrary constant value, Voffset: an offset value for the output signal (defined if necessary), In the above formula, the term, kx(Vr−Vf) represents the correction term when the backward flow occurs. As the output signals of two heating resistors are the same when the forward flow occurs, the correction term is zero, and the output signal of the forward flow heating resistor is used. On the other hand, as the output signal of the backward flow heating resistor is higher when the backward flow occurs, the component due to the backward flow can be corrected.

And furthermore, by adding the constant value k to the difference between the output signals of the forward flow heating resistor and the backward flow heating resistor, a flexible correction can be done. The offset value for the output signal, Voffset, is defined if necessary.

Figure 4:
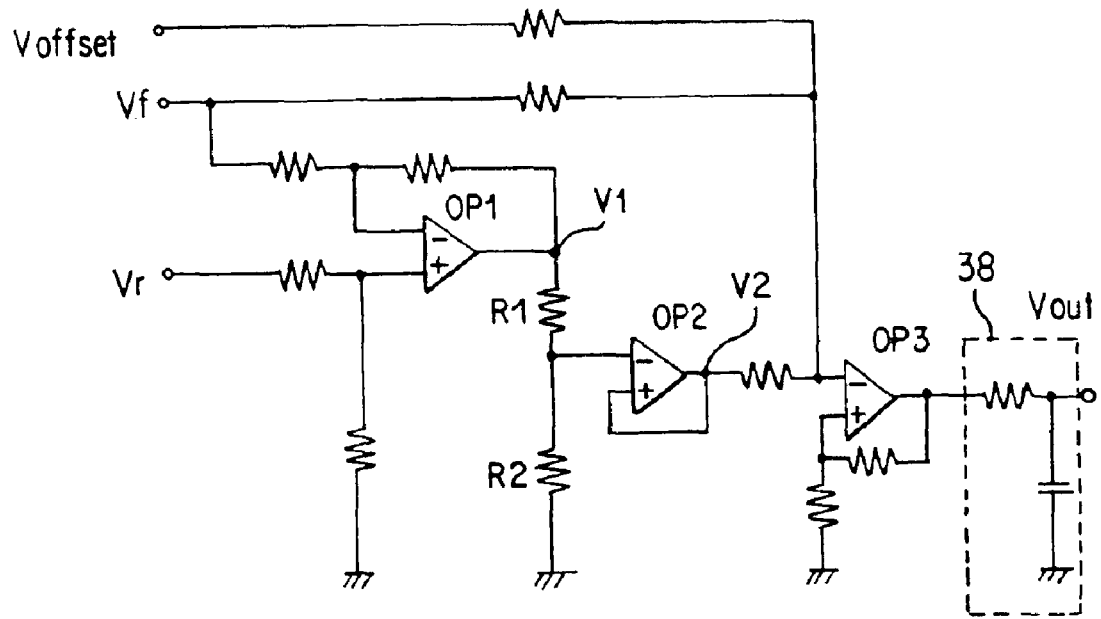
FIG. 4 is a circuit diagram of the output correction part in the heating resistor type air flow rate measuring apparatus showing one embodiment related to the first object of the present invention.

FIG. 4 shows an example of the circuit structure based on the formula 1. This circuit is composed of three operational amplifiers. Those operational amplifiers have their own functions. The output V1 of OP1 is used for supplying the difference between the output signals of the forward flow heating resistor and the backward flow heating resistor (the term (Vr−Vf) in the formula 1). The output V2 of OP2 represents the multiplication of the output V1 of OP1 and the constant value k defined by the ratio between R1 and R2. (kx(Vr−Vf) in the formula 1). The final output Vout of OP3 represents the summation of the output OP2, the output signal of the forward flow heating resistor and the offset value for the output signal as defined by the formula 1. In FIG. 4, the rectangular portion 38 defined with a broken line is an RC filter which is aimed to eliminate noises in the output signal and to allow the output value close to the average of the output signal corresponding to the amplitude of the pulsating flow to be read into the control unit without influence of the sampling timing. The RC filter may be imbedded into the signal input part of the engine control unit in the circuits of the heating resistor type air flow rate measuring apparatus. Though this circuit is basically composed of three operational amplifiers, it is possible to establish the equivalent circuit composed of two operational amplifiers by reforming the formula 1. The detailed structure of the equivalent circuit is not shown here.

Figure 5:
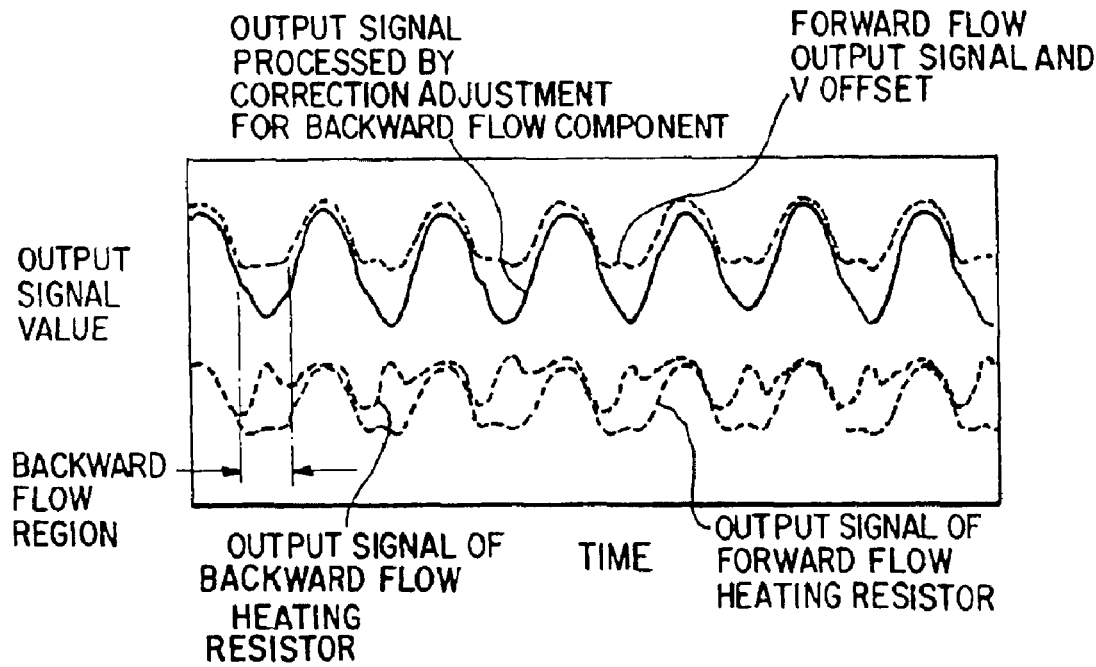
FIG. 5 shows pulsating waveforms of the output signals of the heating resistors in the existence of the pulsated air flows in the experiments using the heating resistor type air flow rate measuring apparatus according to one embodiment related to the first object of the present invention.

FIG. 5 is the observation result of the pulsated flow wave forms in the pulsated operation region accompanying a backward flow in the heating resistor type air flow rate measuring apparatus of the present invention. The apparatus is mounted on the actual engine and has the circuit structure shown in FIGS. 1 and 4 and the output signal characteristic shown in FIG. 3. Two curves laying in the lower part of the chart represents the output signals of the forward flow heating resistor and the backward flow heating resistor, respectively, and the solid line curve represents the output signal of the heating resistor type air flow rate measuring apparatus of the present invention. The output signal of the heating resistor type air flow rate measuring apparatus according to the present invention is defined by the formula 1. For reference, the output signal generated by adding only the offset value to the output signal of the forward flow heating resistor is shown by the broken line.

Referring to the output signals of the forward flow heating resistor and the backward flow heating resistor at first, the output signal of the forward flow heating resistor and the output signal of the backward flow heating resistor are almost the same when the forward flow occurs, but the output signal of the backward flow heating resistor is larger than the output signal of the forward flow heating resistor when the backward flow occurs. Those are output signal characteristics in accordance with the output signal characteristics shown in FIG. 3. And furthermore, referring to the final output signals, in comparison with the output signal generated by adding only the offset value to the output signal of the forward flow heating resistor, shown by the broken line, the output signal corrected with the backward flow component is almost equal to the output signal generated by adding only the offset value to the output signal of the forward flow heating resistor when the forward flow occurs, but smaller when the backward flow occurs. This means that the averaged output signal when the backward flow occurs can be reduced. Thus, it is proved experimentally that the air flow rate measuring apparatus of the present invention can detect the backward flow, and that there is such an effect that the output signal of the forward flow heating resistor can be reduced when the backward flow occurs which is the primary object of the present invention.

Figure 6:
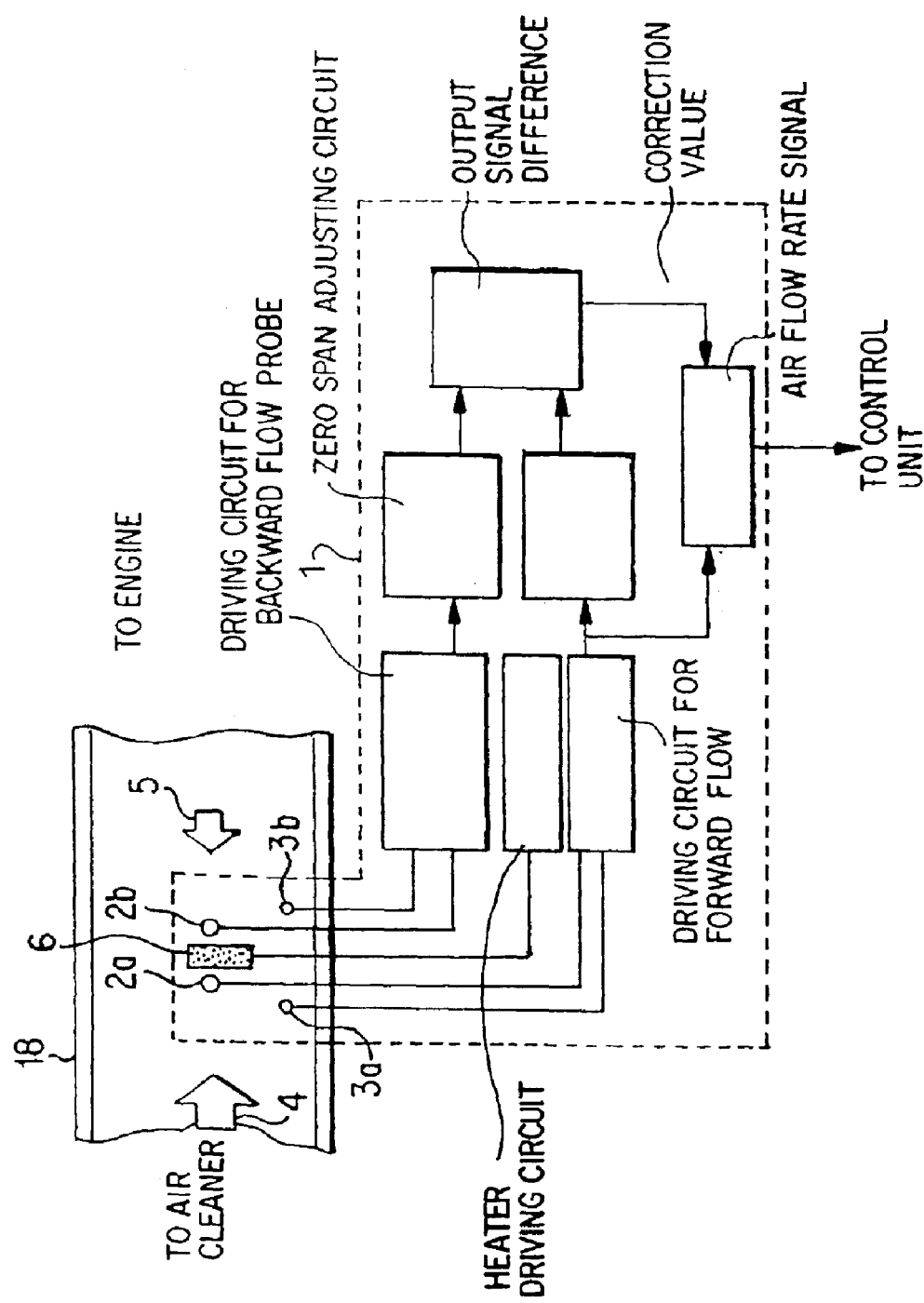
FIG. 6 is a block diagram of the heating resistor type air flow rate measuring apparatus according to another embodiment related to the first object of the present invention.

FIG. 6 is a block diagram of the heating resistor type air flow rate meter in another embodiment of the present invention. The basic structure of the block diagram in FIG. 6 is almost the same as that in FIG. 1. The specific difference from FIG. 1 is that a heater 6 is placed between the couple of heating resistors 2a, 2b so that the thermal interference may be established between the heater 6 and the individual heating 2a, 2b resistors instead of exchanging heat directly between the two heating resistors. The reason why the structure shown in FIG. 6 is used is that, if the distance between two heating resistors is too short, the final output signal of the heating resistors is disturbed due to the heat exchange between the heating resistors even in the single-directional air flow. This resultantly leads to noise in the output signal of the heating resistor type air flow rate measuring apparatus. It is evident that the heat interference between the heat resistors can not be fully established and hence, the air flow direction can not be detected if two heat resistors are kept away from each other too much.

Figure 7:
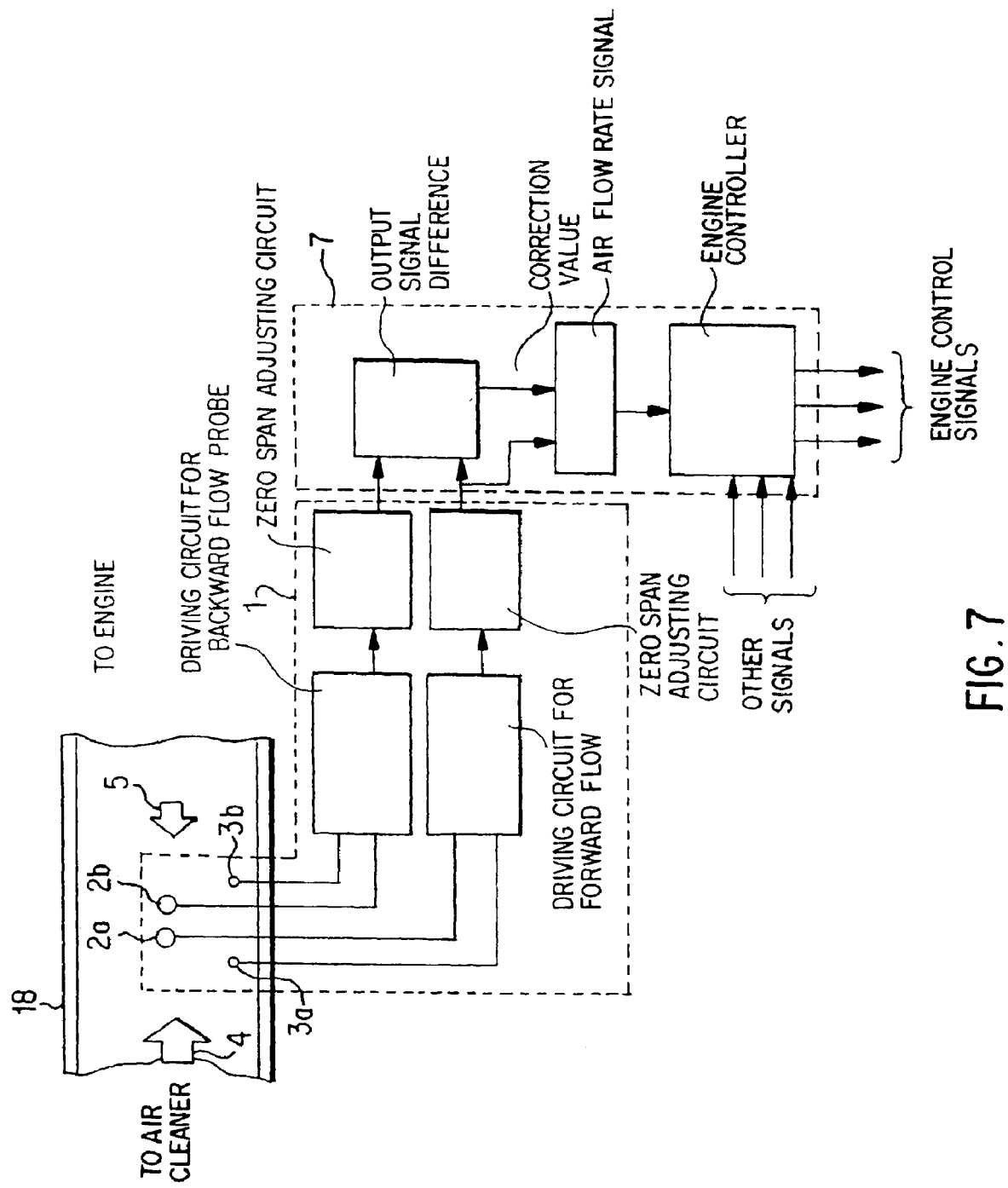
FIG. 7 is a block diagram of the system where the signal processing apparatus has a function of the heating resistor type air flow rate measuring apparatus showing another embodiment related to the first object of the present invention.

FIG. 7 is a block diagram of the heating resistor type air flow rate meter and its output signal processing apparatus in another embodiment of the present invention. The basic structure of the block diagram in FIG. 7 is almost the same as that in FIG. 1. The specific difference from FIG. 1 is that the circuit of the heating resistor type air flow rate measuring apparatus only comprises a couple of heating resistors and the zero span circuit for their output signals, where two individual signals for the forward flow and the backward flow are supplied to the signal processing apparatus. Those output signals are processed for the signal correction and the detection of the air flow direction by the signal process apparatus. In this embodiment, by enabling a part of the signal processing apparatus to operate as the signal processing function of the heating resistor type air flow rate measuring apparatus, there is such an advantage that the circuit structure of the heating resistor type air flow rate measuring apparatus itself can be simplified.

Figure 8:
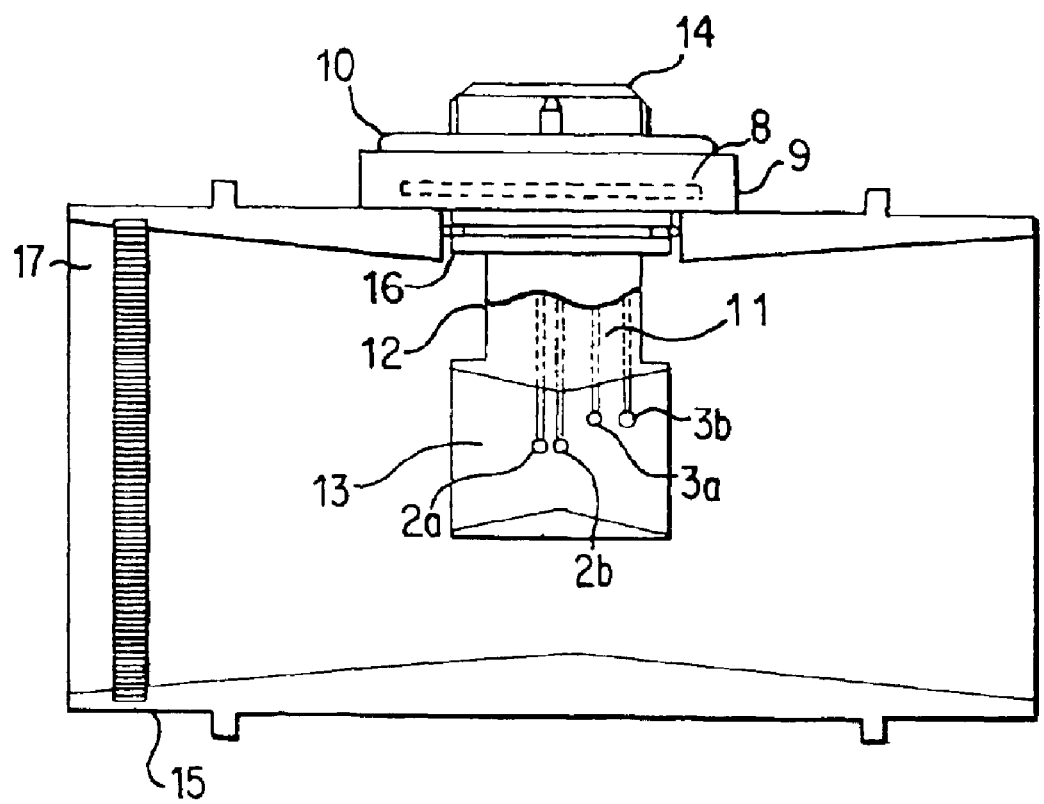
FIG. 8 is one structural example of the heating resistor type air flow rate measuring apparatus related to the first object of the present invention.

FIG. 8 is a schematic structural diagram of the heating resistor type air flow rate measuring apparatus of the present invention. The structure contains a circuit board 8 on which the zero span circuit and the signal processing circuit are integrated, a protector member including a housing member 9 and a cover member 10 for protecting the circuit board 8, sensor members including the heating resistors 2a, 2b and the sensing resistors 3a, 3b, conductive members 11 for electrically connecting between the sensor members and the circuit board, a supporting member for supporting the sensor members and the connecting members, a sub air route in which the heating resistors are placed, and a connector part 14 which functions as an interface to the outside of the apparatus. All of the members are configured as a single module. The sensor part of the module and the sub air passage and other members are inserted in the penetration hole 16 of the body member 15. A honeycomb lattice 17 is installed in the body member 15 for reducing the disturbance in the air flow comprising the main air passage in the intake air passage of the combustion engine. The overall structure of the heating resistor type air flow rate measuring apparatus is so formed by fixing the module and the body with screws.

Figure 9:
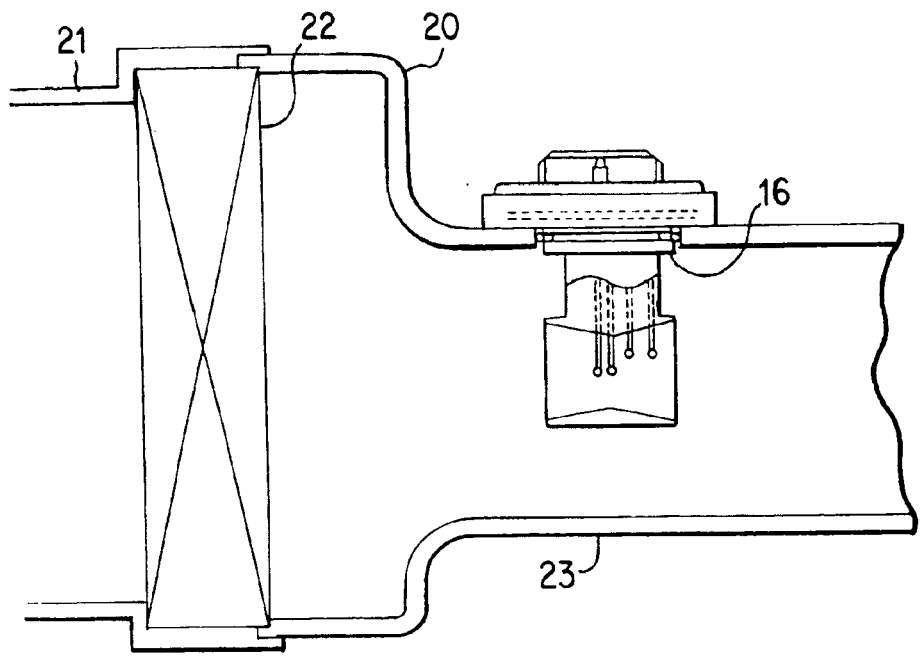
FIG. 9 is another structural example of the heating resistor type air flow rate measuring apparatus related to the first object of the present invention.
Figure 10:
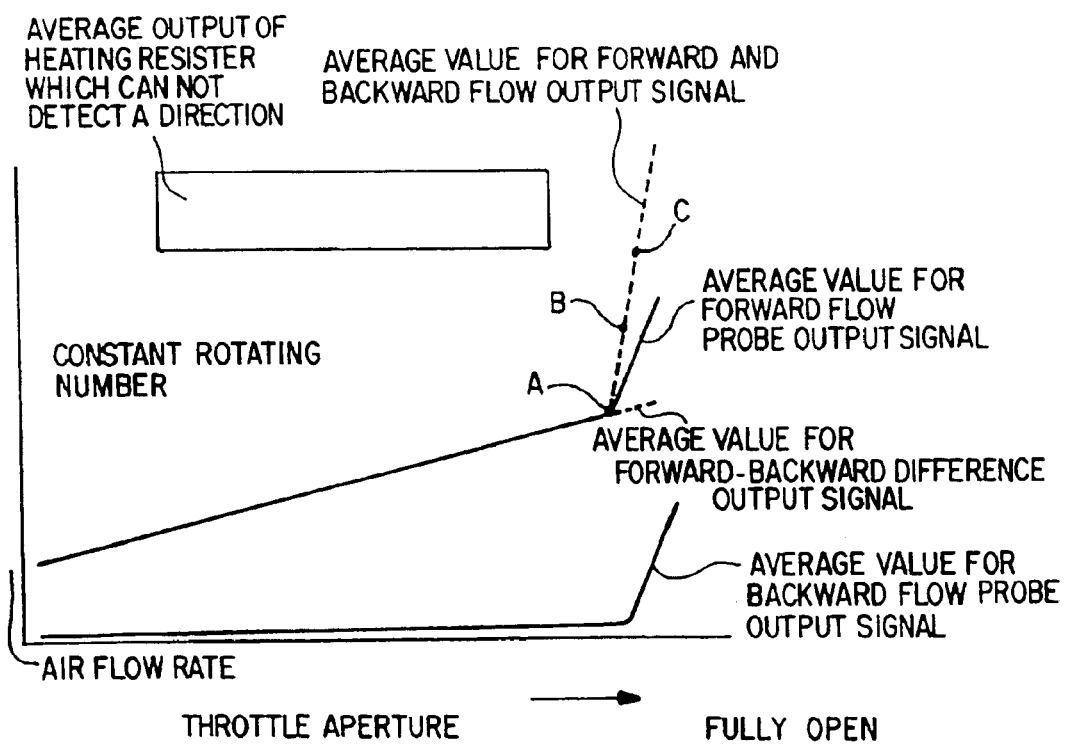
FIG. 10 shows an over-shooting phenomena of the heating resistors in case of altering the intake negative pressure by opening gradually the throttle while keeping constant the number of rotations of the engine.
Figure 11A:
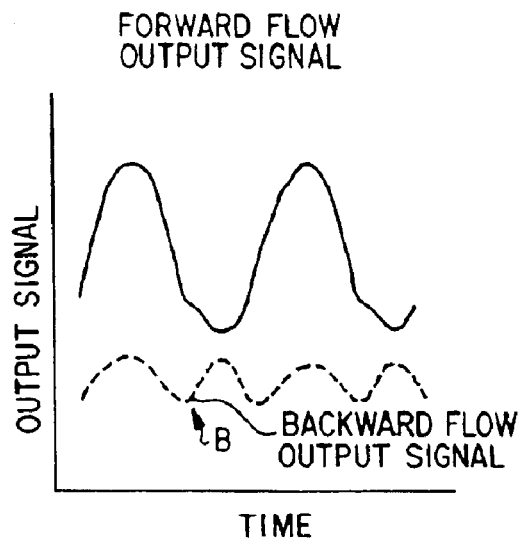
FIGS. 11A and 11B show output signals of the individual heating resistors at the individual throttle angles in case of using the output signal alternation method and in case of using the heating resistors having response delay characteristics.
Figure 11B:
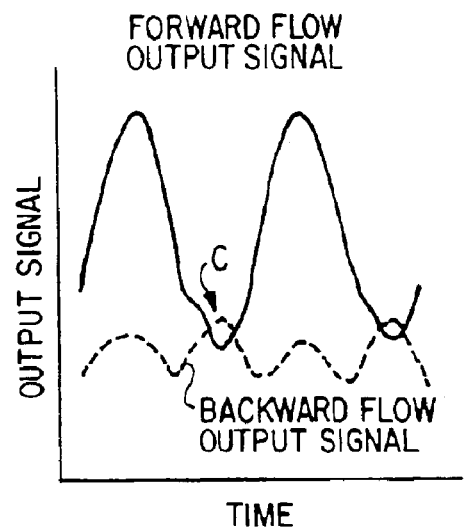

FIG. 9 is the structure of the apparatus where the body member comprising the main air passage of the intake air passage is not formed as part of the heating resistor type air flow rate measuring apparatus, but rather is configured by using the intake air passage composite duct of the combustion engine. In this embodiment, what is used as the body member is the composite member of the air cleaner 20 used for removing the dust in the air supplied into the engine. The body member is placed in the air flow down stream of the air cleaner element 22. A penetration hole 16 is formed in the air cleaner housing composition member formed with the duct 23 used as the main air passage for the heating resistor type air flow rate measuring apparatus as a single unit. Thus, the single unit containing the heating resistor type air flow rate measuring apparatus and the air cleaner housing composition member 20 is fixed with screws. According to this structure, by using the existing components, a heating resistor type air flow rate measuring apparatus without a newly-built body can be provided at low cost.

Figure 12:
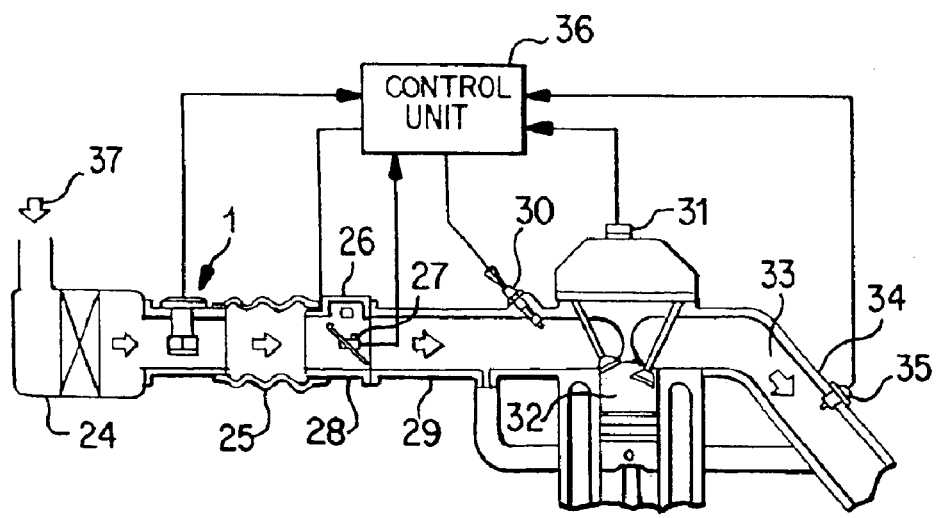
FIG. 12 shows a system controller diagram for controlling the internal combustion engine by using the heating resistor type air flow rate measuring apparatus related to the first object of the present invention.

Finally, referring to FIG. 12, another embodiment of the present invention applied to the internal combustion 25 engine using an electronic fuel injection system is shown.

The intake air 37 coming through the air cleaner 24 goes through the body of the heating resistor type air flow rate measuring apparatus 1, the intake duct 25, the throttle body 28 and the intake manifold 29 having the injector 30 for injecting the fuel, and reaches the engine cylinder 32. The gas generated in the engine cylinder 33 is exhausted through the exhaust manifold 34.

The air flow rate signal supplied by the circuit module of the heating resistor type air flow rate measuring apparatus, the throttle valve angle signal supplied by the throttle angle sensor 27, the oxygen content signal supplied by the oxygen content sensor 35 installed in the exhaust manifold 34 and the engine rotation velocity signal supplied by the engine tachometer 31 are put into the control unit 36, where an optimal fuel injection amount and an optimal valve aperture are calculated and determined by using those signals, and the injector 30 and the idle control valve 26 are controlled by using those calculated optimal values.

Next, the preferred embodiments related to the apparatus which can attain the second object of the present invention will be described in detail with reference to FIGS. 13 to 18.

Figure 13:
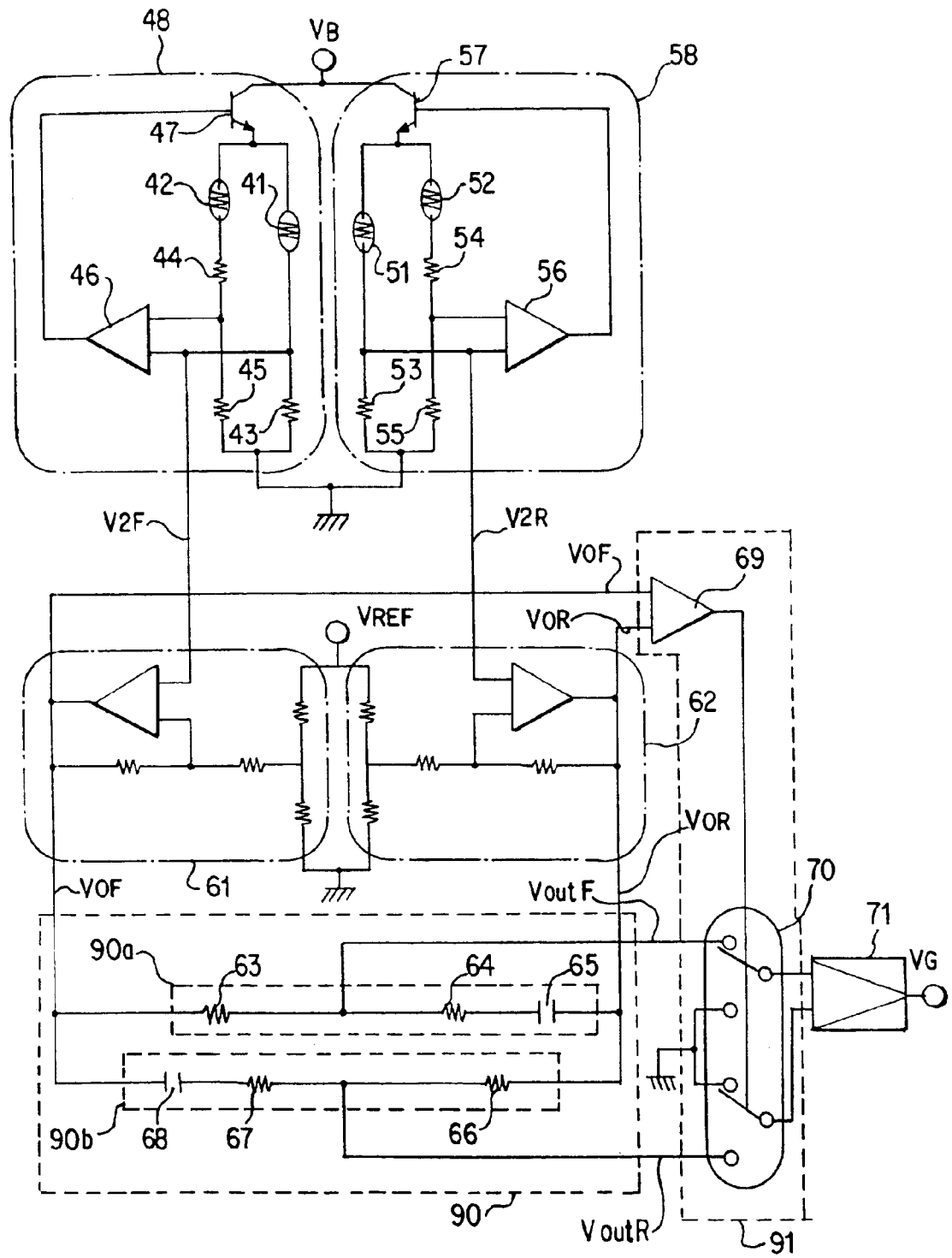
FIG. 13 is a circuit diagram showing a heating resistor type air flow rate measuring apparatus according to a first embodiment related to a second object of the present invention.

FIG. 13 is a circuit diagram showing a heating resistor type air flow rate measuring apparatus according to one embodiment of the present invention. The heating resistor type air flow rate measuring apparatus of the present embodiment is constructed by using air flow rate detecting parts 48, 58, characteristic adjusting circuits 61, 62, a cancelling means 90, a switching circuit 91, and a differential amplifier 71.

In FIG. 13, the air flow rate detecting parts 48, 58 are provided with Wheatstone bridge circuits comprising heating resistors 41, 51, air temperature detecting resistors 42, 52 and resistors 43, 44, 45, 53, 54, 55, and constant temperature control circuits comprising operational amplifiers 46, 56 and transistors 47, 57 which supply a current to the Wheatstone bridge circuits and correct the resistance values of the heating resistors 41, 51 to be constant, in accordance with the value of the air temperature detecting resistors 42, 52. The pair of air flow rate detecting parts 48 and 58 detect heating currents for the heating resistors 41 and 51 by using the resistors 43 and 53 for detecting the currents, respectively, and output a forward flow detection signal V2F and a backward flow detection signal V2R, respectively. The heating resistors 41 and 51 each have higher detection sensitivity with respect to either one of the forward flow and the backward flow.

In other words, one air flow rate detecting part 48 detects the heating current necessary to heat the forward flow heating resistor 41 positioned in an air passage to the predetermined temperature as the forward flow detection signal V2F, and the other air flow rate detecting part 58 detects the heating current necessary to heat the backward flow heating resistor 51 installed in an air passage to the predetermined temperature as the backward flow detection signal V2R.

The forward flow detection signal V2F and the backward flow detection signal V2R have their characteristics adjusted by characteristic adjusting circuits 61 and 62, respectively, and are output as a forward flow adjustment signal VOF and a backward flow adjustment signal VOR, respectively. After that, these adjustment signals VOF and VOR are compared with each other by a comparater 69, and the larger signal is selected by a switching circuit 70. Namely, a direction of air flow is determined by the comparison of the large and small signals of the forward flow adjustment signal VOF and the backward flow adjustment signal VOR in the comparater 69 or signal comparing means.

Finally, a differential amplifier 71 inverses the voltage when the backward flow is detected, amplifies a forward flow cancellation signal VOUTF or a backward flow cancellation signal VOUTR, which is an output signal VOUT, and outputs flow rate signal VG including the component of the direction of air flow.

If the heating resistor for detecting the forward flow and the heating resistor for detecting the backward flow are thermally connected to each other, then the change in the heating current of each of the heating resistors has a complimentary relationship. Further, the forward flow adjustment signal VOF and the backward flow adjustment signal VOR have differential mode noises of which phases there are inverted with each other. Similarly to the prior art, if either one of these adjustment signals including the differential mode noises is selected and used as an output signal VOUT of the flow meter, then the output signal VOUT and the flow rate signal VG also include the noises. While the component of the differential mode noise can be eliminated by using an attenuation method, for example, by averaging the components of alternating currents of the forward and backward flow adjustment signals, there is the problem in which the delay of detection becomes large due to the attenuation when the air flow was inverted.

Accordingly, in the present invention, the noise can be eliminated without the delay of detection at the time when the air flow is inverted. Namely, in the embodiment of FIG. 13, the forward flow cancellation output signal VOUTF in which the component of the alternating current of the backward flow signal is added to the forward flow signal, is obtained from the forward flow adjustment signal VOF adjusted in characteristic by using one cancelling means or circuit 90a comprising resistors 63, 64 and a capacitor 65. The backward flow cancellation output signal VOUTR in which the component of the alternating current of the forward flow signal is added to the backward flow signal, is obtained from the backward flow adjustment signal VOR adjusted in characteristic by using the other cancelling means 50a comprising resistors 66, 67 and a capacitor 68. While the cancelling means 90 in the present embodiment is constructed by one cancelling means 90a and the other cancelling means 90b, it does not necessarily require both cancelling means.

A switching means or circuit 91 comprising the signal comparing means or comparater 69 and the signal selecting means or switching circuit 70, inputs the forward and backward flow adjustment signals VOF and VOR adjusted in characteristic which are indicative of a forward and a backward direction of air flow, respectively, and controls the switching operation of the switch circuit 70. Namely, the direction of the forward and backward flow is detected, the switching operation of the switching circuit 70 is performed, and the output signal VOUT (VOUTF or VOUTR) of which the noise was cancelled is output. It is possible to use the forward flow detection signal V2F and the backward flow detection signal V2R, instead of the adjustment signals VOF and VOR, respectively.

As described above, it is possible to attenuate or cancel and eliminate the differential mode noise without a large detection delay at the time when the air flow is inverted.

To sum up, in the present invention, the component of the alternating current of the backward flow detection signal is added to the forward flow detection signal, and that of the forward flow detection signal is added to the backward flow detection signal. Namely, the circuit is constructed so as to cancel the differential mode noises included in two detection signals by adding the components of the alternating currents of the respective detection signals opposed to the forward flow detection signal V2F and the backward flow detection signal V2R to each other.

In other words, if an air flow meter which can detect a backward flow is constructed by two air flow rate detecting parts each including a heating resistor, the two heating resistors thermally interfere with each other as they are thermally close to each other, the excess quantity of heat is transferred to the other heating resistor as a heating current supplied to one heating resistor increases, and the heating current is decreased by the air flow rate detecting part on the side of the heating resistor suffering from the excess quantity of heat. As a result, two heating current detection signals (detection signals V2F, V2R) include noise components of which the phases are inverted. Accordingly, the present invention is constructed so as to eliminate the above noise components by adding the components of the alternating currents of the two heating current detection signals to each other.

In the first embodiment, the cancelling means 90 further can include a signal selecting means for selecting either one of the forward flow cancellation output signal and the backward flow cancellation output signal.

Figure 14:
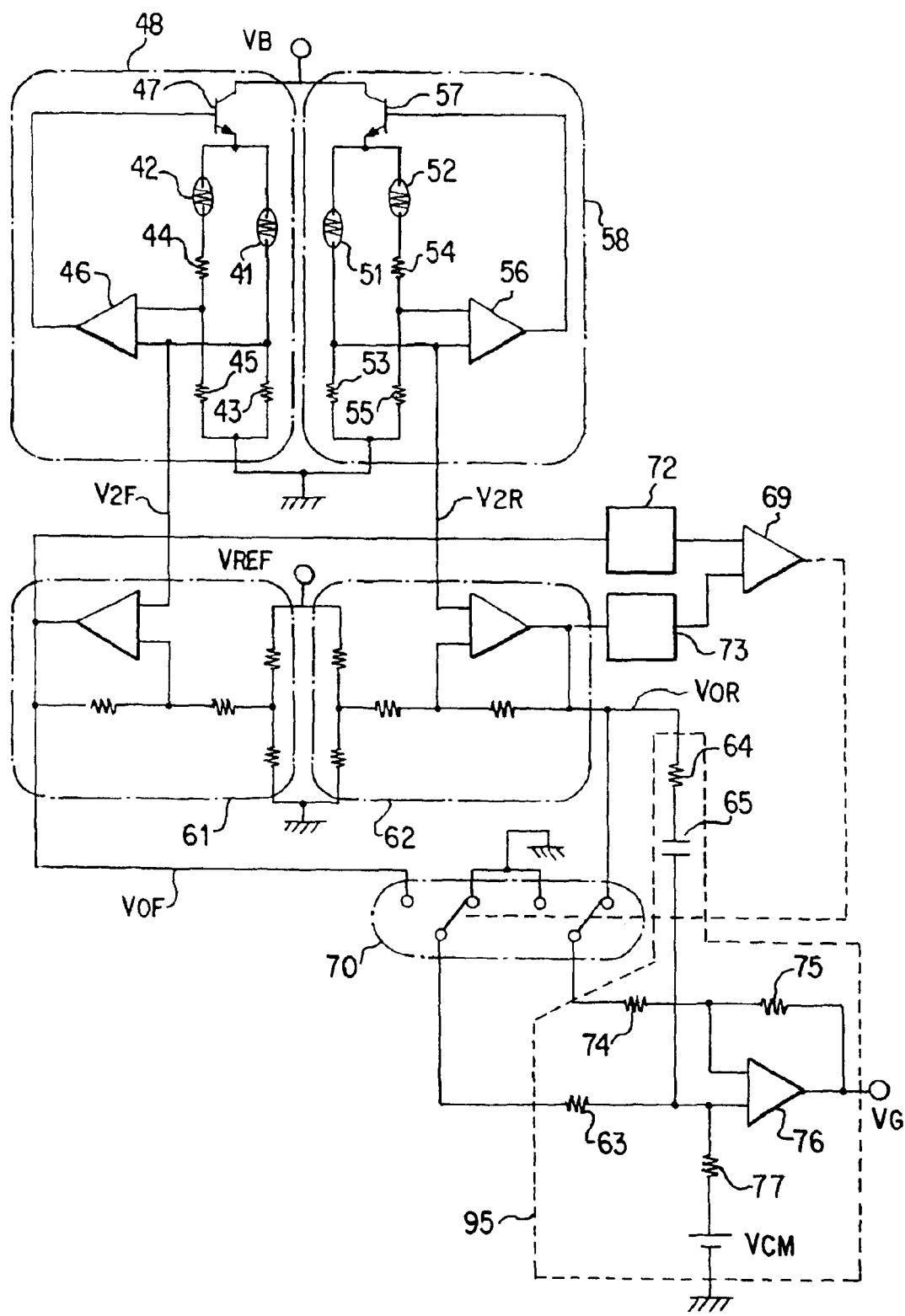
FIG. 14 is a circuit diagram showing a heating resistor type air flow rate measuring apparatus according to another embodiment related to the second object of the present invention.

FIG. 14 is a circuit diagram showing a heating resistor type air flow rate measuring apparatus according to another embodiment related to the second object of the present invention. The second embodiment will be explained.

In the embodiment of FIG. 14, a differential amplifying circuit 95 comprises a circuit having an operational amplifier 76, resistors 63, 74, 75, 77 and a reference voltage VCM. The circuit 95 outputs a flow rate signal VG indicative of both the forward flow and the backward flow directions. The circuit is constructed so as to input the adjustment signal VOF or VOR selected by the switching circuit 70 switched by the output of the comparater 69, and output a flow rate signal VG indicative of both directions of the forward and the backward flow and indicative of the reference voltage VCM when the flow rate is at zero (0). In addition, the circuit 95 has a circuit having a resistor 64 and a capacitor 65 for adding in advance only the component of the alternating current of the backward flow adjustment signal VOR.

Namely, in this embodiment, only the component of the alternating current of the backward flow adjustment signal VOR is added to the forward flow adjustment signal VOF by an alternating current signal pick-up means having the resistor 64 and the capacitor 65, in order to cancel the differential mode noises. In other words, the cancelling means, the switching means and the differential amplifier are formed integrally in the apparatus according to the present embodiment.

According to the embodiment of FIG. 14, the differential mode noise of the forward flow adjustment signal VOF can be effectively decreased. Further, the differential mode noise of the backward flow adjustment signal VOR also can be decreased. This occurs when the heating resistor 41 for detecting the forward flow is thermally connected to the heating resistor 51 for detecting the backward flow, because the component of the alternating current within the range of the frequency defined by the circuit having the resistor 64 and the capacitor 65, which acts as a noise filter, is cut off.

Further, if the output voltage of the apparatus shown in FIG. 14 is set to the reference voltage VCM when the flow rate is at zero, it is possible to operate the apparatus by a single power source for an automobile.

In this embodiment, the delay of detection of the occurrence of the backward flow can be improved by correcting the original delay of response in the heating resistor type air flow rate measuring apparatus using equalizers 72, 73 provided at the previous stage of the comparater 69 for determining a direction of flow into which the forward and backward flow adjustment signals adjusted in characteristic are input. It should be appreciated that it is possible to provide the equalizers 72, 73 to other embodiments, as well as to remove them.

Figure 15:
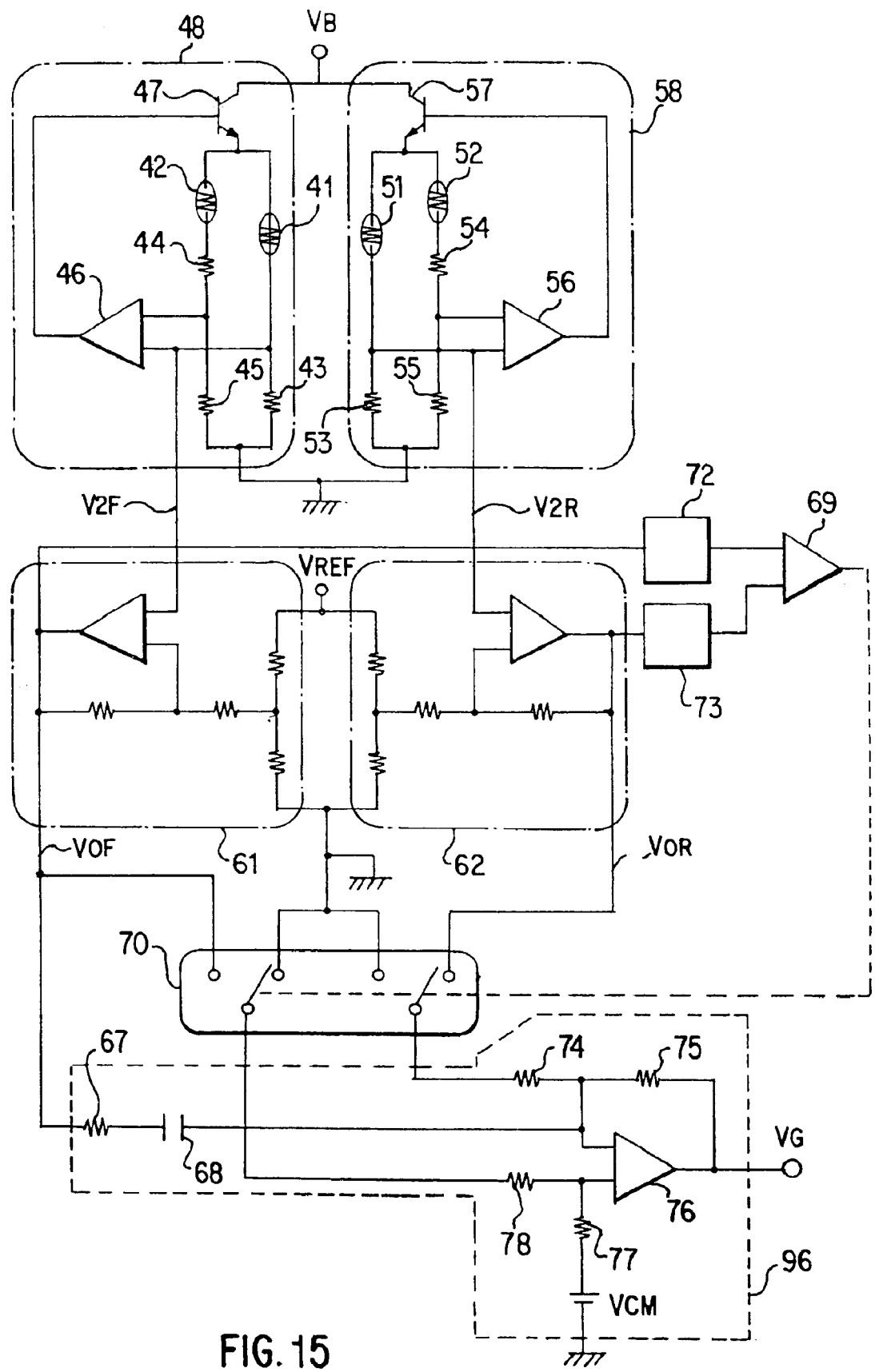
FIG. 15 is a circuit diagram showing a heating resistor type air flow rate measuring apparatus according to a third embodiment related to the second object of the present invention.

FIG. 15 is a circuit diagram showing a heating resistor type air flow rate measuring apparatus according to a third embodiment of the present invention. The third embodiment will be explained with reference to FIG. 15.

In the embodiment of FIG. 15, a differential amplifying circuit 96 comprises a circuit having an operational amplifier 76, resistors 74, 75, 77, 78 and a reference voltage VCM. The circuit is constructed so as to input the adjustment signal VOF or VOR selected by the switching circuit 70 switched by the output of the comparater 69, and output an output voltage indicative of the reference voltage VCM when the flow rate is at zero. The circuit 96 also includes a circuit having a resistor 67 and a capacitor 68. In this embodiment, the phase of the component of the alternating current of the forward flow adjustment signal VOF is inverted by the circuit having the resistor 67 and the capacitor 68, and then the component of the alternating current with the inverted phase is input to the operational amplifier 76. The cancelling means, the switching means and the differential amplifier are formed integrally in the apparatus according to the present embodiment According to the embodiment of FIG. 15, the differential mode noise of the forward flow adjustment signal VOF can be decreased, which occurs when the heating resistors are thermally connected to each other. This is because the component of the alternating current within the range of the frequency defined by the circuit having the resistor 67 and the capacitor 68 which acts as a noise filter is cut off. The differential mode noise of the backward flow adjustment signal VOR also can be decreased.

Figure 16:
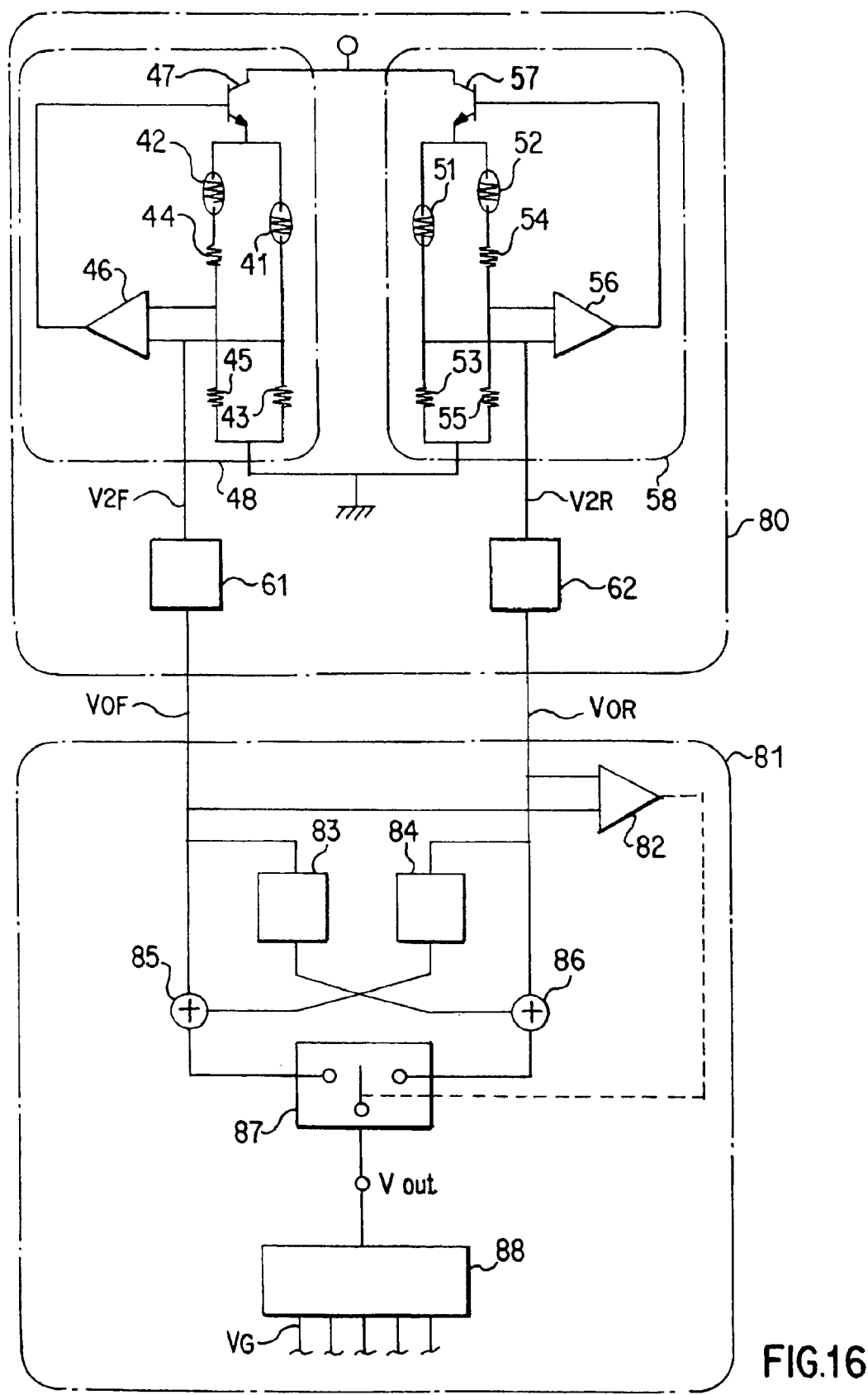
FIG. 16 is a circuit diagram showing a heating resistor type air flow rate measuring apparatus according to a fourth embodiment related to the second object of the present invention.

FIG. 16 is a circuit diagram showing a heating resistor type air flow rate measuring apparatus according to a fourth embodiment of the present invention. The fourth embodiment will be explained with reference to FIG. 16.

In FIG. 16, an air flow meter 80 or the heating resistor type air flow rate measuring apparatus is constructed by the air flow rate detecting parts 48, 58 and the characteristic adjusting circuits 61, 62. The forward and the backward flow adjustment signals VOF, VOR are transmitted from the air flow meter 80 to a fuel injection amount control unit 81 for an internal combustion engine. The two adjustment signals VOF and VOR in the fourth embodiment are the same as the forward and the backward flow detection signals in a broad sense.

A signal comparing means 82, alternating current extracting means 83, 84, signal adding means 85, 86 and a signal selecting means 87 are provided inside of the fuel injection amount control unit 81 of a fuel injection amount control system for an internal combustion engine. The fuel injection amount control unit 81 produces the output signal VOUT including a directional component, and transmit the output signal VOUT to a signal processing means 88 as the information necessary to control the fuel injection amount. The signal processing means 88 processes the output signal VOUT and makes the flow rate signal VG.

Accordingly, one cancelling means 90a comprises the alternating current extracting means 84 and the signal adding means 85, and the other cancelling means 90b comprises the alternating current extracting means 83 and the signal adding means 86. The switching means 91 comprises the signal comparing means 82 and the signal selecting means 87. Namely, in this embodiment, the switching means for selecting one of input signals or two adjustment signals and the cancelling means for adding the alternating current component of one input signal to the other input signal and adding that of the other input signal to one input signal and outputting the resultant signals, are provided in the fuel injection amount control unit 81 which is a semiconductor electronic circuit.

According to the embodiment of FIG. 16, it is possible to reduce the cost of a fuel injection amount control system, because the signal comparing means 82, the alternating current extracting means 83, 84, the signal adding means 85, 86, the signal selecting means 87 and so on can be integrated into the fuel injection amount control unit 81, and it is possible to share the arithmetic unit for the fuel injection amount control unit 81 and the above-mentioned means.

Figure 17:
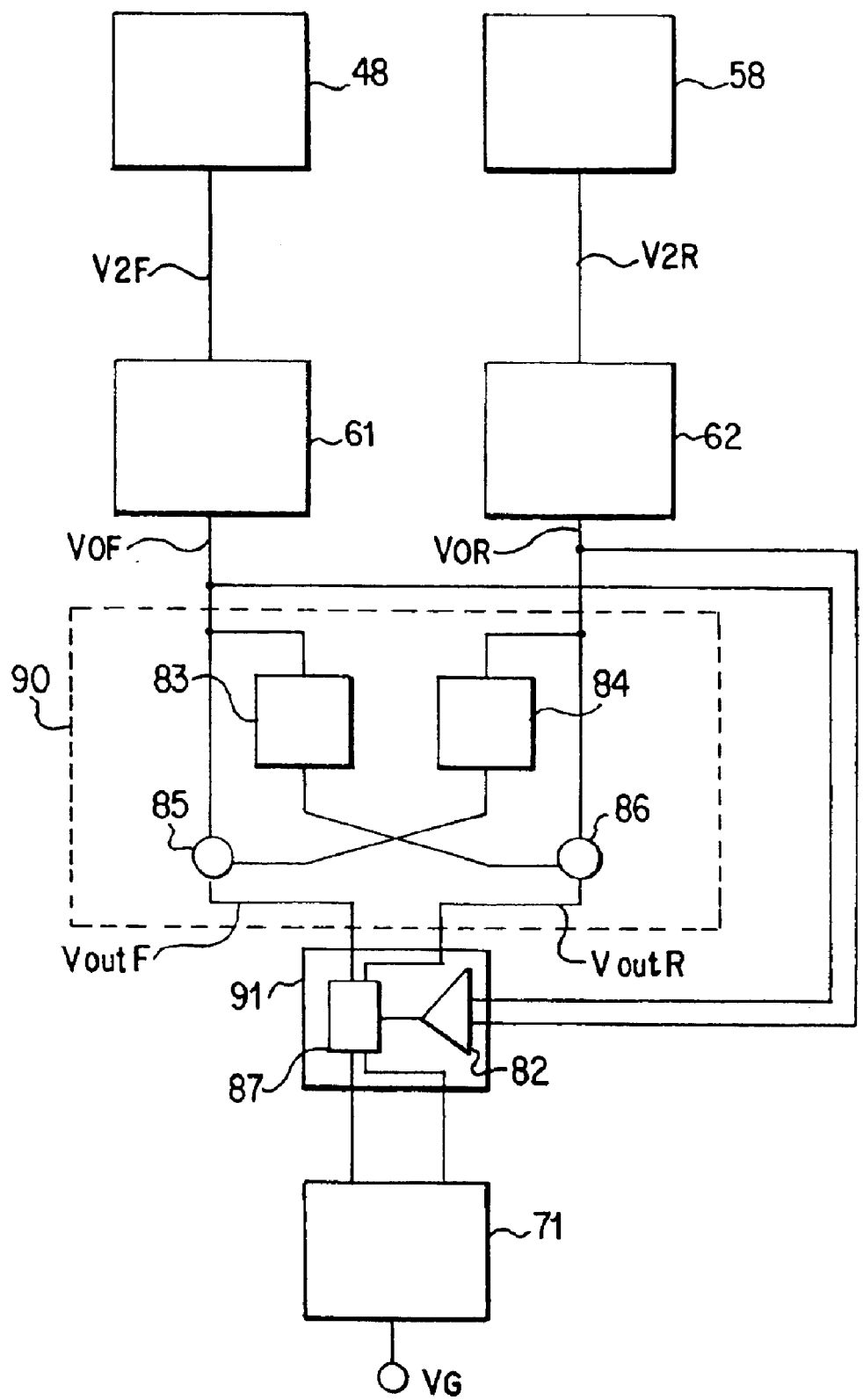
FIG. 17 is a circuit diagram showing a heating resistor type air flow rate measuring apparatus according to a fifth embodiment related to the second object of the present invention.

FIG. 17 is a circuit diagram showing a heating resistor type air flow rate measuring apparatus according to a fifth embodiment of the present invention. This embodiment is different from the embodiment of FIG. 16 in that the heating resistor type air flow rate measuring apparatus is not installed integrally with the fuel injection amount control unit 81.

A cancelling means 90 of FIG. 17 is the same as the circuit having the alternating current extracting means 83, 84 and the signal adding means 85, 86 shown in FIG. 16. Further, A switching means of FIG. 17 is the same as the circuit having the signal comparing means 82 and the signal selecting means 87 shown in FIG. 16.

Further, in FIG. 17, the heating resistor type air flow rate measuring apparatus shown in FIG. 13 is shown in blocks. Namely, the alternating current extracting means 83 of FIG. 17 corresponds to the alternating current extracting means having the resistor 67 and the capacitor 68 in FIG. 13. The alternating current extracting means 84 of FIG. 17 corresponds to the alternating current extracting means having the resistor 64 and the capacitor 65 in FIG. 13. The signal adding means 85 of FIG. 17 corresponds to the signal adding means having the resistor 63 and the connection part in FIG. 13. The signal adding means 86 of FIG. 17 corresponds to the signal adding means having the resistor 66 and the connection part in FIG. 13. Still further, the signal comparing means 82 of FIG. 17 corresponds to the comparater 69 of FIG. 13, and the signal selecting means 87 the switching circuit 70 of FIG. 13.

Figure 18:
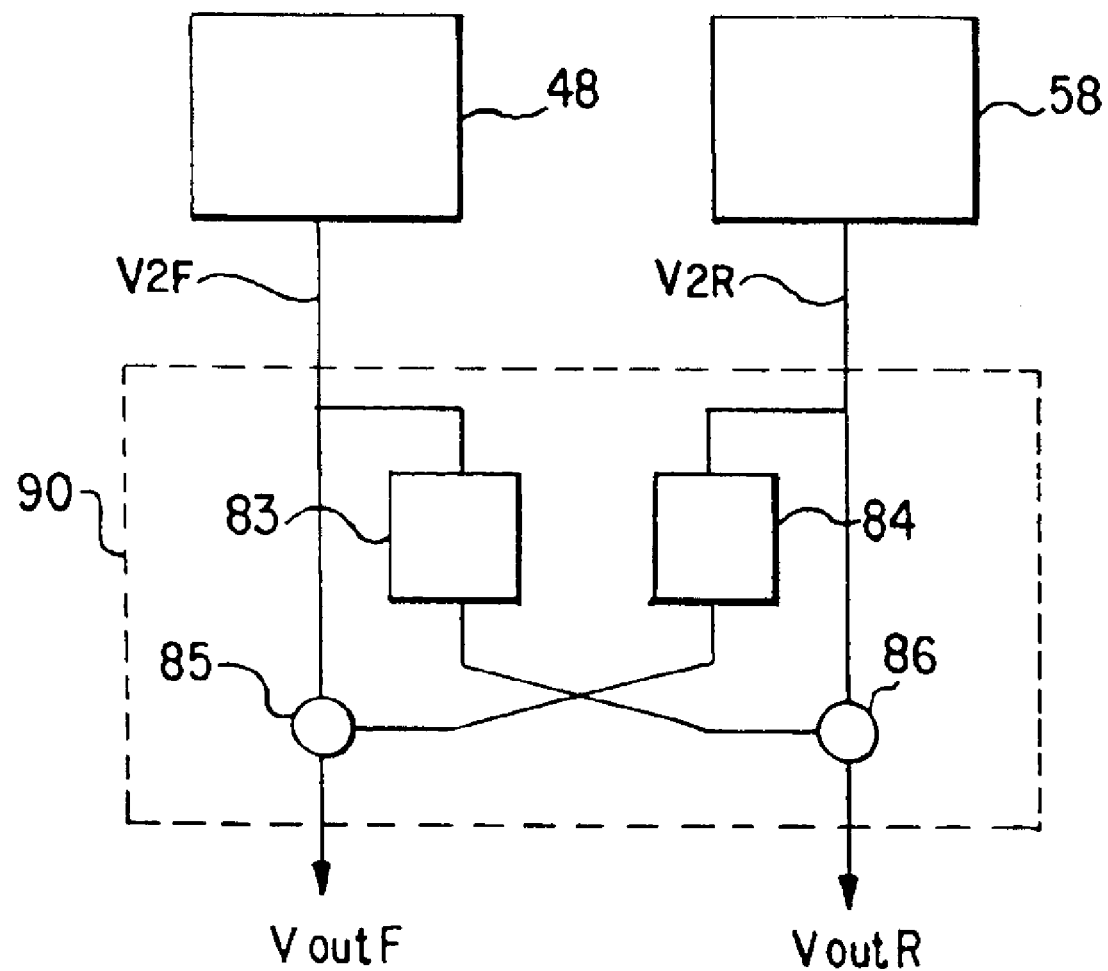
FIG. 18 is a circuit diagram showing a heating resistor type air flow rate measuring apparatus according to a sixth embodiment related to the second object of the present invention.

FIG. 18 is a circuit diagram showing a heating resistor type air flow rate measuring apparatus according to a sixth embodiment related to the second object of the present invention. In the embodiments of FIGS. 13 to 18, while the apparatus including the characteristic adjusting circuits 61, 62, the differential amplifier 71 and so on was explained as the heating resistor type air flow rate measuring apparatus or the air flow meter 80, it should be appreciated that the heating resistor type air flow rate measuring apparatus means the air flow rate detecting parts 48, 58 may be integrated with the cancelling means 90 in a narrow sense.

Namely, such a heating resistor type air flow rate apparatus has a cancelling means for cancelling the differential mode noise components included in forward and backward flow detection signals by adding the alternating current component of the backward flow detection signal to the forward flow detection signal and adding the alternating current component of the forward flow detection signal to the backward flow detection signal, in addition to means for detecting the forward flow detection signal V2F from the heating current necessary to heat the heating resistor for the forward flow installed in the air passage to the predetermined temperature and means for detecting the backward flow detection signal V2R from the heating current necessary to heat the heating resistor for the backward flow installed in the air passage to the predetermined temperature.

In this case, the air flow rate signal VG can be obtained by using the forward flow cancellation output signal VOUTF and the backward flow cancellation output signal VOUTR which are output from the cancelling means.

In a heating resistor type air flow rate measuring apparatus or air flow meter comprising an air flow rate detecting part and a characteristic adjusting circuit, it is also possible to provide the cancelling means 90 between the air flow rate detecting parts 48, 58 and the characteristic adjusting circuits 61, 62.

What is claimed is:

1. A heating resistor type air flow rate measuring apparatus for measuring an air flow rate with a heating resistor installed in an air passage, comprising:

a couple of heating resistors installed in the air passage, each of said heating resistors outputting a respective output signal;

wherein a compensated air flow rate signal is output irrespective of the flow direction by correcting a difference value between the output signal of one heating resistor and the output signal of the other heating resistor.

2. A heating resistor type air flow rate measuring apparatus according to claim 1, wherein said correcting of the difference value is performed by multiplying a constant value or a variable constant determined in response to an air flow rate and the difference value between output signals of said two heating resistors.

3. A heating resistor type air flow rate measuring apparatus according to claim 1, wherein said two heating resistors are placed at closed positions where said two heating resistors interfere thermally with respect to air flow.

4. A heating resistor type air flow rate measuring apparatus according to claim 1, wherein an output signal of a heating resistor placed at a upper stream of an air flow is used as said reference output signal of said heating resistor used as a reference.

5. A heating resistor type air flow rate measuring apparatus according to claim 1, wherein said two heating resistors include two independent drive circuits.

6. A heating resistor type air flow rate measuring apparatus according to claim 5, wherein output signals obtained by said two heating resistors are adjusted by a circuit so as to be identical to each other with respect to an air flow from a certain direction.

7. A heating resistor type air flow rate measuring apparatus according to claim 1, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

8. A heating resistor type air flow rate measuring apparatus according to claim 1, wherein a filter is mounted between an output part for an output signal and an input part for an air flow rate signal in a control unit for a fuel injection control.

9. A heating resistor type air flow rate measuring apparatus according to claim 1, wherein a fuel injection control is performed in response to an output signal.

10. A heating resistor type air flow rate measuring apparatus according to claim 2, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

11. A heating resistor type air flow rate measuring apparatus according to claim 3, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

12. A heating resistor type air flow rate measuring apparatus according to claim 4, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

13. A heating resistor type air flow rate measuring apparatus according to claim 5, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

14. A heating resistor type air flow rate measuring apparatus according to claim 6, wherein a heating resistor, a driving circuit associated with said heating resistor, a sub air passage in which said heating resistor is installed, and a connector part used as an interface to an outside are formed as a single module; and a penetration hole connecting between an inside part and an outside part of a main air passage part composite member contains at least said sub air passage part in said major air passage.

15. A heating resistor type air flow rate measuring apparatus having a couple of heating resistors thermally interfering with each other with respect to an air flow, each heating resistor including an independent drive circuit, wherein respective output signals of the two heating resistors, which correspond to an air flow rate, being adjusted so that both output signals are the same with respect to an air flow in one direction and said output signals of respective heating resistors being compensated irrespective of the flow direction by correcting a difference value of said output signals of said two heating resistors.

16. A heating resistor type air flow rate measuring apparatus according to claim 15, wherein an intake air flow rate signal is obtained by correcting a difference value between an output signal of one heating resistor and an output signal of the other heating resistor onto a reference output signal obtained by a heating resistor used as a reference.

* * * * *